Nov. 19, 1957    A. E. TOBEY    2,813,329
RESURFACING WHEEL
Filed July 24, 1953
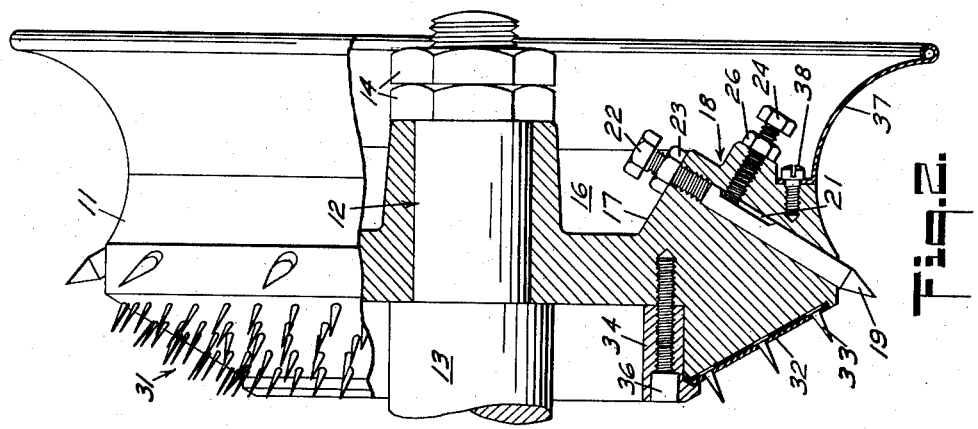
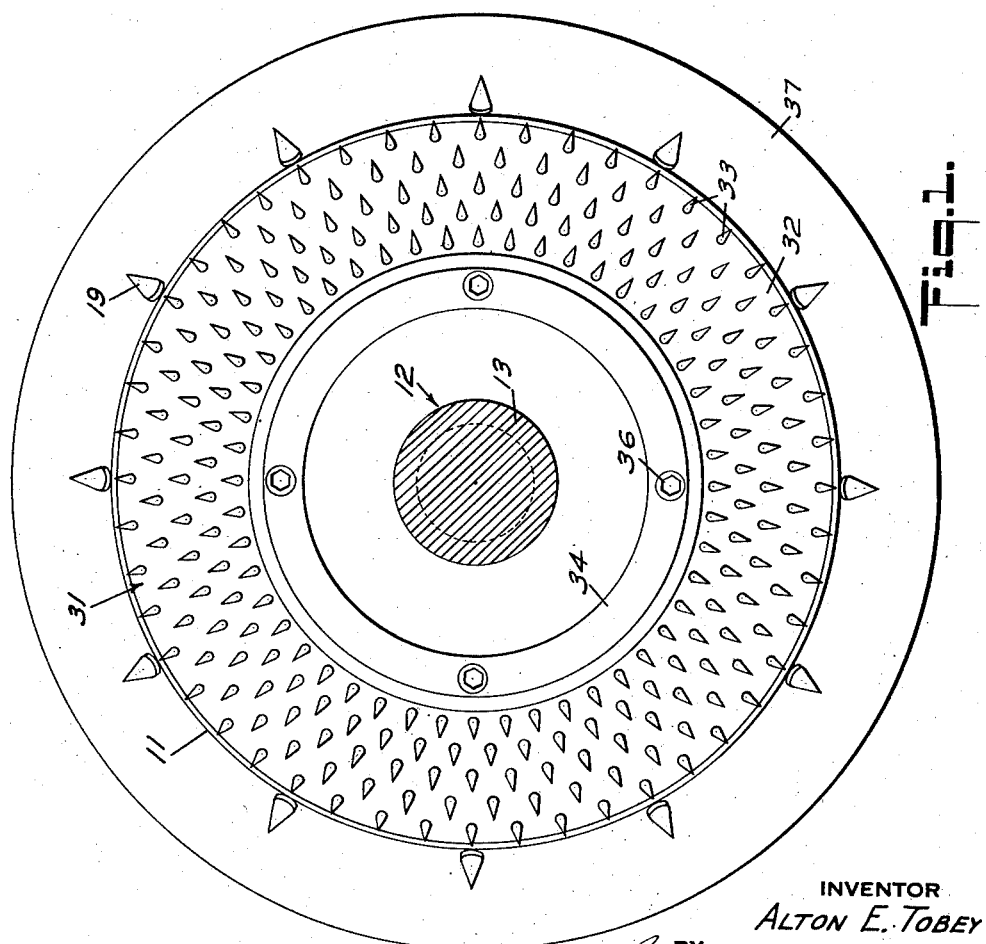
INVENTOR
ALTON E. TOBEY
BY
Gardner & Zimmerman
ATTORNEYS

United States Patent Office 2,813,329
Patented Nov. 19, 1957

2,813,329

RESURFACING WHEEL

Alton E. Tobey, Santa Cruz, Calif.

Application July 24, 1953, Serial No. 370,106

6 Claims. (Cl. 29—78)

The present invention relates in general to an improved resurfacing wheel and more particularly to a wheel adapted for buffing rubber tires to remove rubber therefrom and prepare same for recapping.

There have been developed numerous devices for buffing or abrading tires prior to recapping same and one such device is disclosed in my prior Patent No. 2,436,621, issued February 24, 1948, for Abrasive Wheel Casing. Commonly tire buffers include rasp surfaces having a plurality of relatively small tacks extending through annular metal bands and the abrasive action results from contacting the tread and sidewall surfaces of a tire with the rotating buffer teeth or tacks whereby same remove rubber from the tire. Normally the tire is mounted for rotation relative to the buffer either freely so as to be driven by the buffing wheel or in driven relation thereto with the purpose of thereby producing a symmetrical buffer tire. In addition to the conventional tire buffers which are not particularly well adapted for buffing the sidewalls of tires I have developed an improved tire abrading device disclosed in my copending application, Serial No. 332,411, filed January 21, 1953, and relating to means for buffing tire sidewalls.

In addition to the production of roughened surfaces upon which recapping material will readily adhere the operation of tire buffing serves the further purpose of reducing a tire to a symmetrical shape wherein uniform amounts of recapping material may be deposited thereover. Used tires requiring recapping are commonly worn unevenly so that in many instances large amounts of rubber must be removed from at least some portions of the tire in order that it will have a symmetrical shape and a uniformly thick recap may be applied thereto. Particularly is this true in connection with large tires such as those used on trucks and with a conventional tire buffer many passes are required to remove an appreciable amount of rubber from the tire for the abrading surface of the buffer is formed of relatively small pointed tacks that are quite advantageous in producing the desired roughened tire surface for recapping but are not particularly well adapted for removing large amounts of material through their abrading action. Consequently, it has proven quite tedious and time consuming work to prepare tires for recapping that require much more than roughening of the surface thereof. The very term "tire buffer" or "abrader" indicates the limitations thereof with regard to relatively large scale removal of rubber from the tire and the present invention is designed to overcome these limitations, with the entitlement of the present being merely indicative of the type of device contemplated rather than any limitations as to functionality thereof.

It is an object of the present invention to provide improved means for preparing a tire for recapping.

It is another object of the present invention to provide an improved resurfacing wheel including cutting and abrading means integral therewith.

It is a further object of the present invention to provide an improved resurfacing wheel having adjustable cutting means thereon for controlled cutting and abrading.

It is yet another object of the present invention to provide an improved resurfacing wheel including abrading means and retractable cutting means in combination therewith for controlled cutting and abrading.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

A preferred embodiment of the invention is illustrated in the accompanying drawing, wherein:

Figure 1 is a front elevational view of the resurfacing wheel;

Figure 2 is a side elevational view of the resurfacing wheel partially broken away and shown in section as indicated to show details of construction.

With regard to the structural details of the illustrated embodiment of the invention there is provided a generally annular hub or drum 11 formed of a structural material such as iron or the like and having a central axial aperture therethrough. The hub 11 preferably has a recessed front face and a shaft 12 is adapted to engage the hub through the aperture therein with an expanded shaft portion 13 within the hub recess forming a shoulder about the hub aperture in engagement with the recessed hub face. The shaft end extending through the hub 11 may be threaded and a pair of nuts 14 threaded thereon to clamp the hub against the shaft shoulder and lock the hub to the shafe whereby the two are rigidly joined together. The shaft 12 is adapted to be rotated as by a motor (not shown) and the hub 11 rotates therewith, other joining means such as keying being adaptable to produce the required hub-shaft connection.

As regards the hub configuration there are preferably formed a plurality of indentations in the back surface of the hub or a single annular recess 16 about the shaft 12, as shown. The hub thus includes a semi-toroidal section 17 at the back surface thereof and there are provided for the purpose of producing a cutting action a plurality of cutting means 18 mounted in the hub and extending through the toroidal portion 17 thereof. Considering a single cutting means 18, as shown in Figure 2, same will be seen to include an elongated cutter tool 19 having a beveled or tapered outer end forming a cutting surface and being disposed within a radial aperture or bore 21 through the toroidal portion 17 of hub 11. This aperture is inclined outwardly of the hub so that the cutter 19 is directed outward and upward from the threaded end of the shaft 12 with the cutting edge disposed beyond the periphery of the hub 11. There are provided as a part of the cutting means 18 adjusting means for locating and locking the radial extension of the cutter 19 and such means includes an adjusting screw 22 threaded into the innermost end of the radial aperture from the annular hub recess 16 and preferably including a fixed head, as shown, to facilitate rotation of the screw. A nut 23 is threaded upon the adjusting screw 22 intermediate the head thereof and the toroidal hub portion 17 for the purpose of tightening against the hub to lock the adjusting screw 22 in adjusted position. The cutter 19 mates with the aperture 21 in hub 11 in sliding relation to the hub and for the purpose of locking the cutter 19 in position there is provided a lock screw 24 threaded into an aperture in the toroidal hub portion 17 extending from the back surface thereof perpendicular to the aperture 21 therein and intersecting same near the center thereof. Preferably there is formed in the cuter 19 a longitudinal indentation near the center of same so that tightening of lock screw 24 by threading same into the hub moves the lock screw into the cutter indentation and into binding contact with the cutter. The lock screw 24 will thus be seen to forcibly bind the cutter within the aperture 21 in the radial position determined by the adjusting screw 22, and by the locking screw extending into the indentation in the center of cutter 19 additional safety is provided, for even if the lock screw 24 were to slightly loosen it would at most allow the cutter to move into the position of Figure 2 wherein the lock screw contacts the rear of the indentation. Loosening of the lock screw 24 is guarded against by provision of a nut 26 threaded upon the lock screw 24 intermediate a fixed head thereon and the back surface of toroidal hub portion 17 which is preferably formed perpendicular to the lock screw at this radius for maximum engagement of the nut 26 therewith.

A cutting action is produced by the provision of a plurality of cutting means 18 spaced circumferentially about the hub 11 and rotation of the hub in close proximity with an object such as a tire so that the cutters 19 contact the tire about the circumference thereof. Inasmuch as the present invention is particularly adapted to resurface a tire wherein rubber is removed therefrom it is important that the cutters 19 be formed of a very hard material which will retain a cutting edge and to this end cutters 19 are preferably formed of carboloy or have a carboloy tip formed thereon.

In addition to the above-described cutting means adjustably mounted within hub 11 and extending therefrom a variable distance for controlled depth of cut, there is also preferably provided upon hub 11 an abrasive surface such as that disclosed in my copending application Serial No. 332,411. Reference is made to the disclosure of this application for a complete description of the structure, operation and advantages of the abrasive surface thereof, however, in brief the surface or rasp 31 includes one or more frusto-conical bands 32 formed of metal or the like and having a plurality of tacks 33 extending through apertures in the outer band outwardly of the conical surface thereof. A frusto-conical surface is formed about the hub 11 forward of the cutting means 18 and the rasp 31 is placed thereon with a peripheral hub shoulder contacting the rasp band 32 about the maximum circumference thereof and a locking ring 34 overlying the band 32 about the inner circumference thereof and engaging the recessed face of hub 11 as by bolts 36 threaded therein whereby the band is crimped beneath the lock ring 34 and rigidly secured to the frusto-conical hub face. There is also provided upon the rear hub face and extending radially from the hub a heat shield and protective guard 37 which may be attached to hub 11 as by a plurality of spaced bolts 38 threaded through an inwardly extending guard flange and threaded into the rear hub face, as shown. The guard 37 preferably extends rearward from the hub and radially outward therefrom about the circumference thereof as in a curvilinear manner to comprise an annular member having a concave outer surface. Inasmuch as the cutting means 18 of the wheel is adapted to rapidly remove relatively large amounts of rubber from a tire being resurfaced for recapping, the guard 37 is provided to intercept the pieces of rubber cut from the tire and to dissipate the heat formed thereby.

Operation of the improved abrasion wheel or resurfacing wheel of the present invention is quite simple and in general is well set out in my above noted patent and copending application with the exception of the cutting action here provided. In use of the wheel the cutting means 18 are adjusted to dispose the cutters 19 a desired distance from the hub periphery and the cutters are thereupon locked in position by locking means 24. The wheel is then rotated by shaft 12 and placed in contact with an object to be resurfaced such as a tire, with the cutters 19 being employed to rapidly remove large amounts of material and the rasp 31 being employed to remove smaller amounts of material and to produce a desired tire surface.

I claim:

1. An improved resurfacing wheel comprising a rigid hub member mounted for rotation, a plurality of cutters mounted radially of said hub in adjustable relation thereto and extending radially outward of the hub periphery, a rasp rigidly mounted upon said hub about same adjacent said cutters whereby said wheel is adapted to both cut and abrade for optimum resurfacing of materials contacted thereby, and a guard member including a shield surface extending radially from said hub for intercepting material cut by said cutters.

2. A rubber tire resurfacing wheel comprising a rigid hub member having an axial aperture therein and including a frusto-conical surface thereon, a rasp band having a frusto-conical surface mating with the like surface on said hub member and rigidly connected thereto, cutting means including radial cutters mounted circumferentially about said hub adjacent the maximum diameter of said frusto-conical surface, said cutters having substantially pointed end portions of a hardened material and are disposed at uniform angles to said surface, and adjusting means controlling the radial extension of said cutters.

3. A rubber tire resurfacing wheel comprising a hub member having an axial aperture and including a substantially hollow cylindrical portion concentric with the hub aperture, said cylindrical hub portion having a plurality of radial apertures therethrough spaced circumferentially thereabout directed outwardly of the axis of said member, and a plurality of cutting means including hardened cutters mating with said radial hub apertures, and adjusting means therefor contacting said cylindrical hub portion and said cutters for adjusting the radial disposition of said cutters, and means substantially normal to said adjusting means and engageable with medial portions of said cutters for locking the latter in desired adjusted positions.

4. A rubber tire resurfacing wheel comprising a hub member having an axial aperture therethrough, a frusto-conical surface on one face thereof and a rasp mounted thereon, and an annular indentation in the other face thereof about said aperture with a plurality of radial apertures spaced circumferentially about said hub and extending between the annular indentation and the outer hub periphery, a plurality of symmetrically positioned elongated cutters having hardened cutting surfaces at the outer ends thereof and mating with said radial hub apertures, a plurality of adjusting means threadably engaging said hub at the inner end of each of the radial apertures therein for contacting said cutters and radially positioning same, and a plurality of locking means threadably mounted in said hub for engaging each of said cutters at an angle thereto whereby same are locked in adjusted position extending radially outward of said hub to form a cutting surface thereon.

5. A resurfacing wheel as defined in claim 4 wherein said radial hub apertures uniformly slant toward one end of said hub so that said cutters extend beyond the periphery of said hub and said frusto-conical surface at uniform angles to such surface, and a guard member including a shield surface extending radially from said hub about same on the hub end from which said cutters slant for intercepting material cut by said cutters and dissipating heat produced thereby.

6. A resurfacing wheel comprising a hub member having an axial aperture therethrough and including a surface of frusto-conical form concentric with said axial hub aperture, a frusto-conical rasp having abrading means extending radially outward therefrom and mating with said frusto-conical hub surface, retaining means secured to said hub and bearing upon said rasp for rigidly mounting said rasp upon said hub, said hub further including a hollow cylindrical portion extending axially from the large end of said frusto-conical portion and including a plurality of circumferentially spaced radial apertures therethrough sloping outwardly toward said frusto-conical hub portion, a plurality of elongated cutters having hardened cutting ends disposed one in each of said radial hub apertures with the cutting end extending outwardly of the hub periphery and individually mating with said apertures for sliding engagement therein, a plurality of adjusting means threadably engaging said cylindrical hub portion at the inner ends of said radial hub apertures for contacting said cutters and radially positioning same, and locking means threadably engaging said cylindrical hub portion in bearing relation to the cutters extending therefrom for binding same within the radial hub apertures and fixing their adjusted radial position extending predetermined distances beyond the hub periphery, and means for dissipating heat from said hub produced by the cutting action of said cutters.

References Cited in the file of this patent
UNITED STATES PATENTS

| | | |
|---|---|---|
| 1,284,092 | Gray | Nov. 5, 1918 |
| 2,035,802 | George | Mar. 31, 1936 |
| 2,140,831 | Ecklund et al. | Dec. 20, 1938 |
| 2,300,861 | Bacon | Nov. 3, 1942 |